350-319.

XR  3,929,533

United States Patent [19]
Horn

[11] 3,929,533
[45] Dec. 30, 1975

[54] METHOD OF ASSEMBLING A GLASS SPHERICAL SEGMENT VIEWING PORT TO A SUBMARINE VESSEL

[75] Inventor: George M. Horn, San Diego, Calif.

[73] Assignee: The United States of America as represented by the Secretary of the Navy, Washington, D.C.

[22] Filed: Nov. 1, 1974

[21] Appl. No.: 520,087

[52] U.S. Cl.............. 156/71; 29/469; 114/16 R; 156/99; 156/18; 156/330; 277/235 B; 285/DIG. 11; 52/80
[51] Int. Cl.² ........................................ E04F 13/00
[58] Field of Search .......... 277/DIG. 6, 235 B, 237; 29/463, 469; 161/196, 205; 114/16 R, 16.5, 173; 156/71, 18, 99, 330; 285/DIG. 11; 52/80

[56] References Cited
UNITED STATES PATENTS

| 3,450,082 | 6/1969 | Demarest | 114/16 R |
| 3,616,043 | 10/1971 | Anderson et al. | 156/99 |
| 3,839,109 | 10/1974 | Horn | 156/3 |

Primary Examiner—Edward G. Whitby
Attorney, Agent, or Firm—Richard S. Sciascia; Ervin F. Johnston; William T. Skeer

[57] ABSTRACT

An improved window viewing construction for viewing submersible vehicles and a method of manufacture thereof is described in which a hemispherical glass dome is fitted to a metallic mounting ring which is held in a horizontal position during manufacture to simulate the final installed position thereof. A method of preloading the dome and mounting ring construction by using metal bands which remain on the assembly to further compressionally load the assembly in its operational environment.

5 Claims, 4 Drawing Figures

METHOD OF ASSEMBLING A GLASS SPHERICAL SEGMENT VIEWING PORT TO A SUBMARINE VESSEL

STATEMENT OF GOVERNMENT INTEREST

The invention described herein may be manufactured and used by or for the Government of the United States of America for governmental purposes without the payment of any royalties thereon or therefor.

FIELD OF THE INVENTION

The invention relates to the branch of naval architecture pertaining to deep submergence vehicles. Additionally, the invention relates to the field of glass and metal working technology.

More particularly, but not by way of limitation, the invention concerns viewing ports installed in metal hulls of deep submergence underwater vehicles. In still greater particularity, the invention pertains to the fitting of dome shaped glass forms to metal mounting rings. By way of further characterization, the field of the invention embraces the fitting of hemispheric viewing windows in metal hulled deep submergence vehicles.

DESCRIPTION OF THE PRIOR ART

Modern oceanographic research and ocean engineering applications employ deep submergence vehicles in a wide variety of roles. Although it is known to employ hemispheric viewing domes on deep submergence vehicles, these domes have suffered from fatigue failures and other structural difficulties. For example, one such arrangement is shown in U.S. Pat. No. 3,555,663 to W. R. Forman for "Method of Making an Annular Glass-to-Metal Joint," issued on Jan. 19, 1971. An improved construction and method is shown in the inventor's U.S. Pat. No. 3,757,725 for "Right Spherical Segment-Glass Shell to Metal Joint," issued Sept. 11, 1973. Although satisfactory for its intended purpose, this dome has exhibited structural failures occasioned by dome and metal ring separation commencing at the upper regions of the dome. It is believed that these failures are occasioned by unrelieved stresses caused by curing an assembly in positions other than the final operating position.

SUMMARY OF THE INVENTION

The invention overcomes the afore disadvantages of the prior art by providing an improved glass to metal joint. Furthermore, this invention describes an assembly technique whereby the viewing port is assembled to the mounting ring in its final operating position. That is, with the mounting ring held in a horizontal position such that the glass-to-metal joint extends vertically. Additionally, the invention provides for flexible steel bands to encircle the transparent dome and attach to the mounting ring to be used in preloading the dome in assembly and additionally loading the dome for its operational employment.

STATEMENT OF THE OBJECTS OF INVENTION

Accordingly, it is an object of this invention to provide an improved glass-to-metal joint.

A further object of this invention is to provide a glass-to-metal joint capable of withstanding extreme hydrostatic pressures.

A further object of this invention is to provide a glass hemisphere which is held on a mounting ring by means of flexible steel bands to withstand extreme hydrostatic pressures.

Another object of this invention is to provide a method of manufacture of glass hemispheric viewing port on a deep submergence vehicle.

Still another object of this invention is to provide an improved fabrication technique for mounting viewing ports for deep submergence vehicles in which the glass-to-metal joint is fabricated in its final operational position.

These and other objects of the invention will become more readily apparent from the ensuing specification when taken with the drawings.

DESCRIPTION OF THE PREFERRED EMBODIMENT

Figure 1:
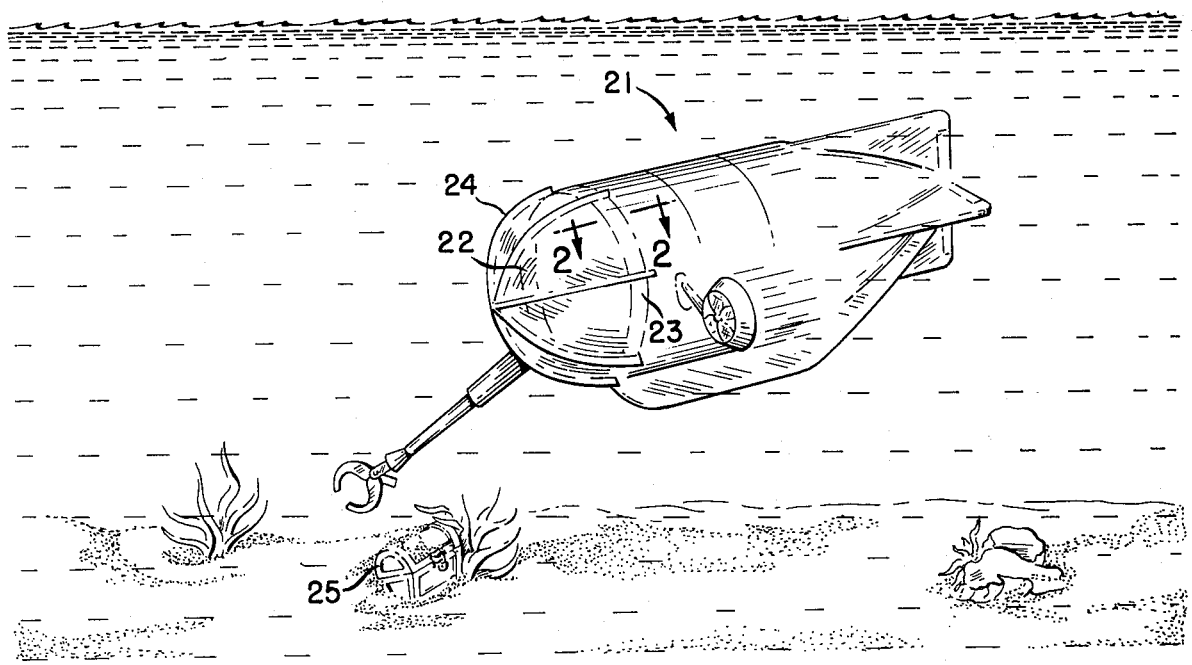
FIG. 1 is a perspective view of the device of the invention shown in its operational environment.

Referring to FIG. 1, a deep submergence vehicle 21 is shown as including a glass hemispheric nose portion 22 which is held to a mounting ring 23 which, in turn, is secured to the fuselage or hull of deep submergence vehicle 21. A plurality of mounting bands 24 encircle glass dome 22 and are attached to mounting ring 23 at diametrically spaced points. As shown, deep submergence vehicle 21 may be employed in underwater exploration as, for example, the location and recovery of underwater objects such as shown at 25.

Figure 2:
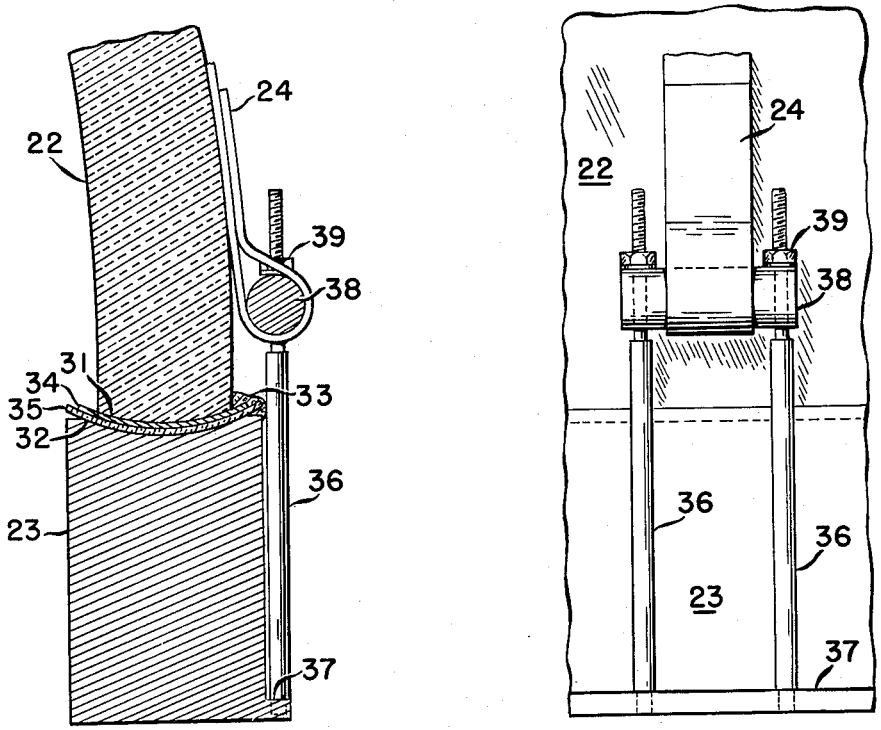
FIG. 2 is a sectional view taken through the glass-to-metal joint held along lines 2—2 of FIG. 1.

Referring to FIG. 2, a sectional view taken along lines 2—2 of FIG. 1 illustrates the constructional details of the dome to mounting ring joint. As shown, dome 22 has a curved face 31 which is lap ground to provide a tight fit with corresponding curved face 32 of mounting ring 23. A bilayer gasket comprising layers 34 and 35 provides strain relief and temperature compensation between dome 22 and mounting ring 23. The bilayer gasket 34–35 is cemented in place in mounting ring 23 and dome 22 by a suitable cement which is allowed to accumulate in a surplus bead indicated at 33. It should be noted, that the details of this construction are given in the inventor's U.S. Pat. No. 3,757,725 referred to above, which is incorporated herein by reference.

As shown, steel band 24 encircles the glass dome 22 and is terminated by a self formed loop. This loop may be formed by spot welding or otherwise bonding the end of steel band 24 back to an intermediate portion of itself.

Figure 3:
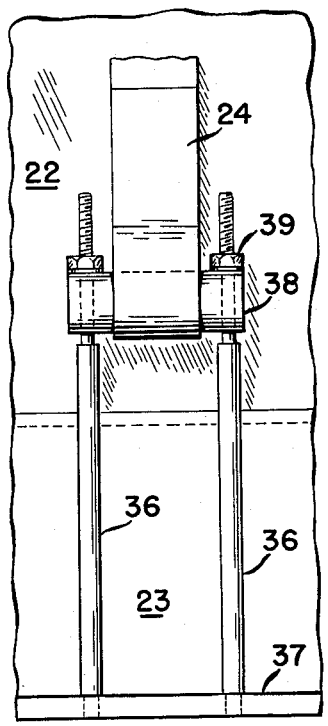
FIG. 3 is a partial elevation view of the connecting features of the invention.

Referring to FIG. 3, suitable retaining means such as threaded studs 36 are threadably held in an outwardly extending collar 37 which may be integrally formed, or otherwise firmly attached, to mounting ring 23. These supports extend upwardly and have threaded ends which extend through a cylindrical attachment dowel 38. Dowel 38 is held within the loop at each end of metal band 24 and is tensioned by means of threaded nuts 39 which threadably engage studs 36. Obviously, metal band 24 may be tensioned to compressionally load dome 22 by tightening threaded nuts 39. Studs 36 together with retaining dowel 38 may be made of any suitable material capable of withstanding the arduous use to which deep oceanographic equipment must contend. For example, stainless steel may be employed in this construction.

METHOD OF MANUFACTURE

Figure 4:
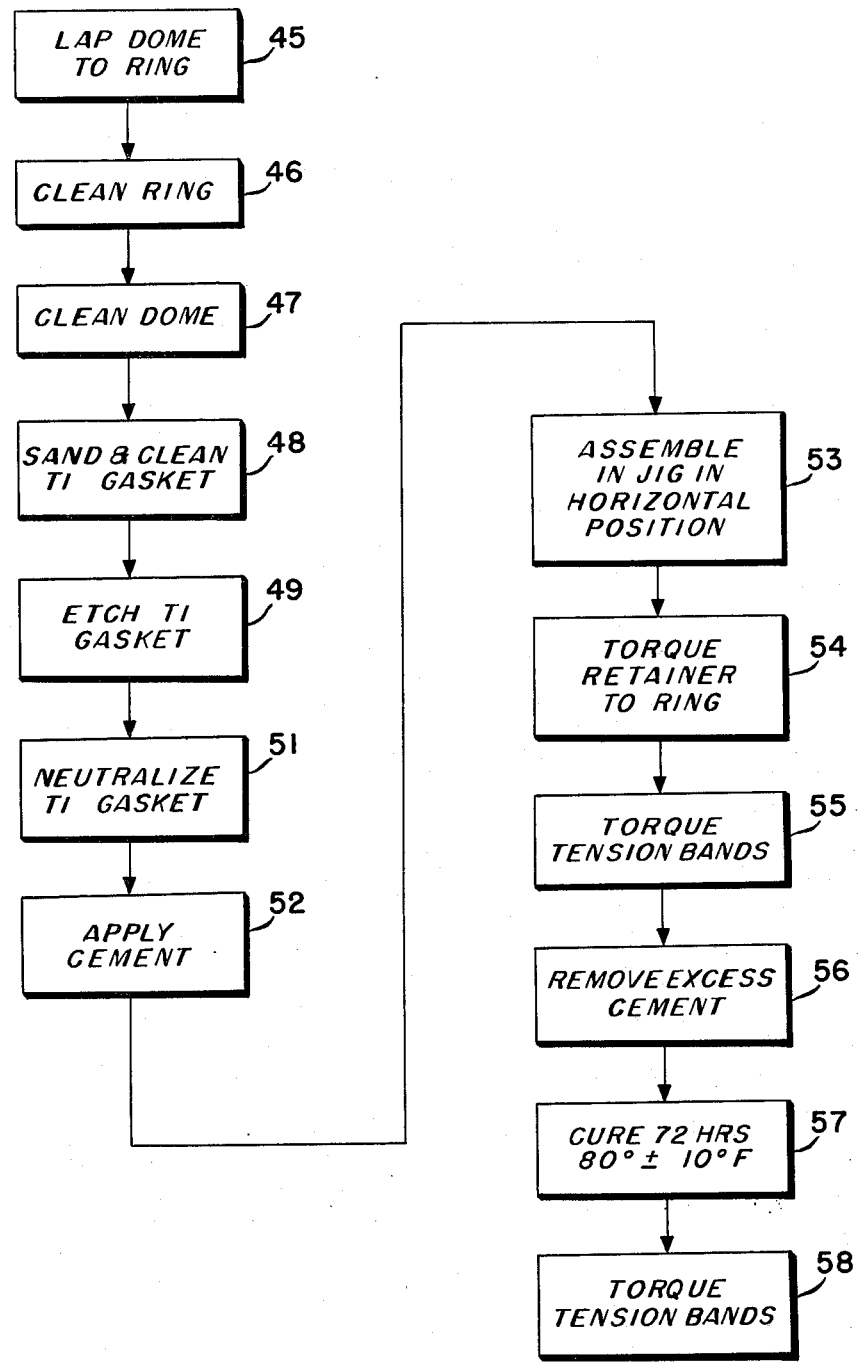
FIG. 4 is a flow diagram of the improved method of the invention.

Referring now to the flow diagram of FIG. 4, the manufacturing steps used in creating the structure of the invention will now be described. It should be noted from the outset, that many of the steps are the same as those described in the inventor's U.S. Pat. No. 3,839,109 which issued Oct. 1, 1974 for "Method of Fabricating Right Spherical Segment Glass Shell-to-Metal-Joint." The first step of the method is to lap dome 22 to mounting dome 23. This is done in a conventional manner with an abrasive grinding compound which ensures absolute conformity between burr surface 31 and surface 32, as explained in the above cited patent.

The next step, indicated by block 46, is to clean the ring 23 by flushing the abrasive compound therefrom by means of suitable solvent. Similarly, as indicated by block 47, a cleansing operation is performed on dome 22. Such cleansing may be facilitated by using absorbant wipers as will be well understood in glass fabrication arts.

As indicated by block 48, the next step in the assembly and manufacture of the invention is to sand and clean the titanium gasket. As indicated by block 49, titanium gasket is next etched with a suitable agent to facilitate cementious bonding thereto. As indicated by block 51, titanium gasket is then neutralized and cement applied thereto, as shown by block 52.

Dome 22 and mounting ring 23, together with the asbestos and titanium bilayer gasket 34-35 are next assembled in a mounting jig which is positioned such as to place mounting ring 23 and dome 22 in a horizontal position such that the glass-to-metal joint extends vertically. Retaining studs 36 are then torqued to mounting collar 37 of retaining ring 23 as indicated by block 54 of the flow diagram. Retainers 38 are then placed in the end zone of bands 24 and inserted over the threaded ends of mounting studs 36 and the tension bands 24 are torqued to a preloaded pressure. The value to which tension bands are tightened, will, of course, depend on which materials are used in the assembly. This preloading has proven advantageous to prevent failure of the cement during curing steps to be described later.

This initial torquing of the bands to preload the dome to ring joint has proven more satisfactory than the mass loaded technique described in the aforecited patent. In order to provide uniformity and gradual preloading, each of the nuts 39 are initially tightened to a torque of twenty inch-ounces. Next, each nut 39 is torqued to 40 inch-ounces. Finally, each nut 39 is torqued to a value of 80 plus or minus 10 inch-ounces.

As is conventional in the threaded fastener art, the threads on either end of stud 36 are chosen such that no loosening of the stud is occasioned by tightening of nuts 39. In this regard, it should be noted that the torquing of retainers studs 36 to ring 23 indicated in step 54 a uniform value of 160 inch-ounces is used in the developmental model. The compressional forces provided by bands 24 cause some of the cement material used in touching dome 22 to mounting dome 23 to be expelled. This excess is wiped away by means of absorbant tissue and cement bead 33 is formed in this operation. This removal of the excess cement is indicated in the flow diagram of FIG. 4 by block 56.

As indicated by block 57, the assembly is now cured in the horizontal position for a time period of 72 hours. During this curing interval, the temperature of the assembly is maintained at 80°F plus or minus 10°F.

Finally, as indicated by block 58, tension bands 24 are tightened by torquing nuts 39 to a final value in excess of that used during the curing process. In the developmental model increased loading was accomplished in two steps. In the first step, each nut was torqued to 100 inch-ounces and in the second step the torque loading on each nut was increased to 160 inch-ounces. After the final torquing is accomplished, the assembly is inspected for mechanical rigidity and at this time, special attention is given to the cement bead 33 and additional cement may be applied to the exterior of the glass hemisphere and metal mounting collar joint to assure that cement bead 33 covers the exposed ends of bilayer gasket 34-35.

The improved dome assembly thus described, has met with operational success and has successfully endured 700 deep submergence dives installed in Navy research vessel Deepview.

The foregoing description taken together with the appended claims constitutes a disclosure such as to enable a person skilled in the marine engineering and naval architecture arts and having the benefit of the teachings contained therein to make and use the invention. Further, the structure herein described meets the objects of invention, and generally constitutes a meritorious advance in the art which would remain unobvious to such a worker not having the benefit of these teachings.

Obviously, many modifications and variations of the present invention are possible in the light of the above teachings and it is therefore understood that the invention may be practiced otherwise than as specifically described.

What is claimed is:

1. In a method of making a panoramic viewing aperture for a deep submersible vehicle which comprises the steps of,
   placing a glass dome in contact with a mounting ring,
   lapping said glass dome into mating surface contact with said mounting ring,
   cleaning said glass dome and mounting ring,
   treating a suitably dimensioned titanium gasket to improve epoxy cement bonding therewith,
   coating an asbestos gasket, said titanium gasket and the lapped surfaces of said glass dome and mounting ring with epoxy cement,
   the improvement comprising:
   assembling the glass dome, mounting ring, titanium gasket, and asbestos gasket such that the titanium gasket is juxtaposed with said glass dome and said asbestos gasket with said mounting ring and the gaskets in mutual contact in a substantially horizontal position such that the joint therebetween extends vertically;
   preloading said assembly with a predetermined compressing force to force the component parts into mating engagement;
   curing said preloaded assembly while maintaining said compressive force for a predetermined time and at a controlled temperature to cause the epoxy cement to bind said components into a unitary assembly;

increasing the preload pressure means to a predetermined amount; and joining said assembly to said deep submersible vehicle to cover an opening therein such that the spatial relationships of the components during curing is preserved, thereby providing a panoramic viewing port therein to withstand operational conditions imposed by deep-sea deployment.

2. A method of making a panoramic viewing port according to claim 1 in which said step of assembling the glass dome, mounting ring, titanium gasket, and asbestos gasket further includes the step of:

installing a plurality of mounting bands about said glass dome and, attaching these bands to the mounting ring.

3. A method of making a panoramic viewing port according to claim 2 in which said step of attaching the mounting bands includes torquing retaining means into threaded engagement with said mounting ring.

4. A method of making a panoramic viewing port according to claim 3 in which the aforesaid step of pre-loading said assembly includes drawing the ends of said mounting bands toward said mounting ring.

5. A method of making a panoramic viewing port according to claim 4 in which the aforesaid step of increasing the preload pressure includes further drawing the ends of said mounting bands toward said mounting ring.

* * * * *